United States Patent
Kendrick

[11] Patent Number: 6,021,754
[45] Date of Patent: Feb. 8, 2000

[54] METHOD AND APPARATUS FOR DYNAMICALLY CALIBRATING A FUEL INJECTOR

[75] Inventor: Larry E. Kendrick, Peoria, Ill.

[73] Assignee: Caterpillar Inc., Peoria, Ill.

[21] Appl. No.: 08/994,473

[22] Filed: Dec. 19, 1997

[51] Int. Cl.⁷ .......................... F02D 41/00; F02M 51/00
[52] U.S. Cl. ............... 123/339.19; 123/478; 123/339.22
[58] Field of Search ................. 123/339.19, 339.12, 123/339.24, 339.22, 339.21, 339.2, 478, 352, 353, 354, 355, 436

[56] References Cited

U.S. PATENT DOCUMENTS

| | | | |
|---|---|---|---|
| 5,070,836 | 12/1991 | Wahl et al. | 123/299 |
| 5,163,398 | 11/1992 | Buslepp et al. | 123/339 |
| 5,357,912 | 10/1994 | Barnes et al. | 123/357 |
| 5,445,128 | 8/1995 | Letang et al. | 123/436 |
| 5,450,828 | 9/1995 | Sakamoto et al. | 123/339.11 |
| 5,517,970 | 5/1996 | Okada et al. | 123/436 |
| 5,732,676 | 3/1998 | Weisman et al. | 123/436 |

FOREIGN PATENT DOCUMENTS

| | | |
|---|---|---|
| 59158339 | 9/1985 | European Pat. Off. . |
| 2720787 | 12/1995 | France . |

*Primary Examiner*—Andrew M. Dolinar
*Assistant Examiner*—Mahmoud M Gimie
*Attorney, Agent, or Firm*—W. Bryan McPherson III

[57] ABSTRACT

The present invention is adapted to provide a method and apparatus for dynamically determining an individualized fuel command for each fuel injector connected to an engine. In the preferred embodiment the method includes delivering a baseline fuel command to each of the injectors. The actual engine speed is then determined. An individualized fuel command is determined for each of the fuel injectors based on the baseline fuel command, and the actual engine speed. In the preferred embodiment the individualized fuel commands are dynamically determined when the engine is idling. In an alternative embodiment, the individualized fuel commands may be used throughout the operating speed range of the engine.

13 Claims, 5 Drawing Sheets

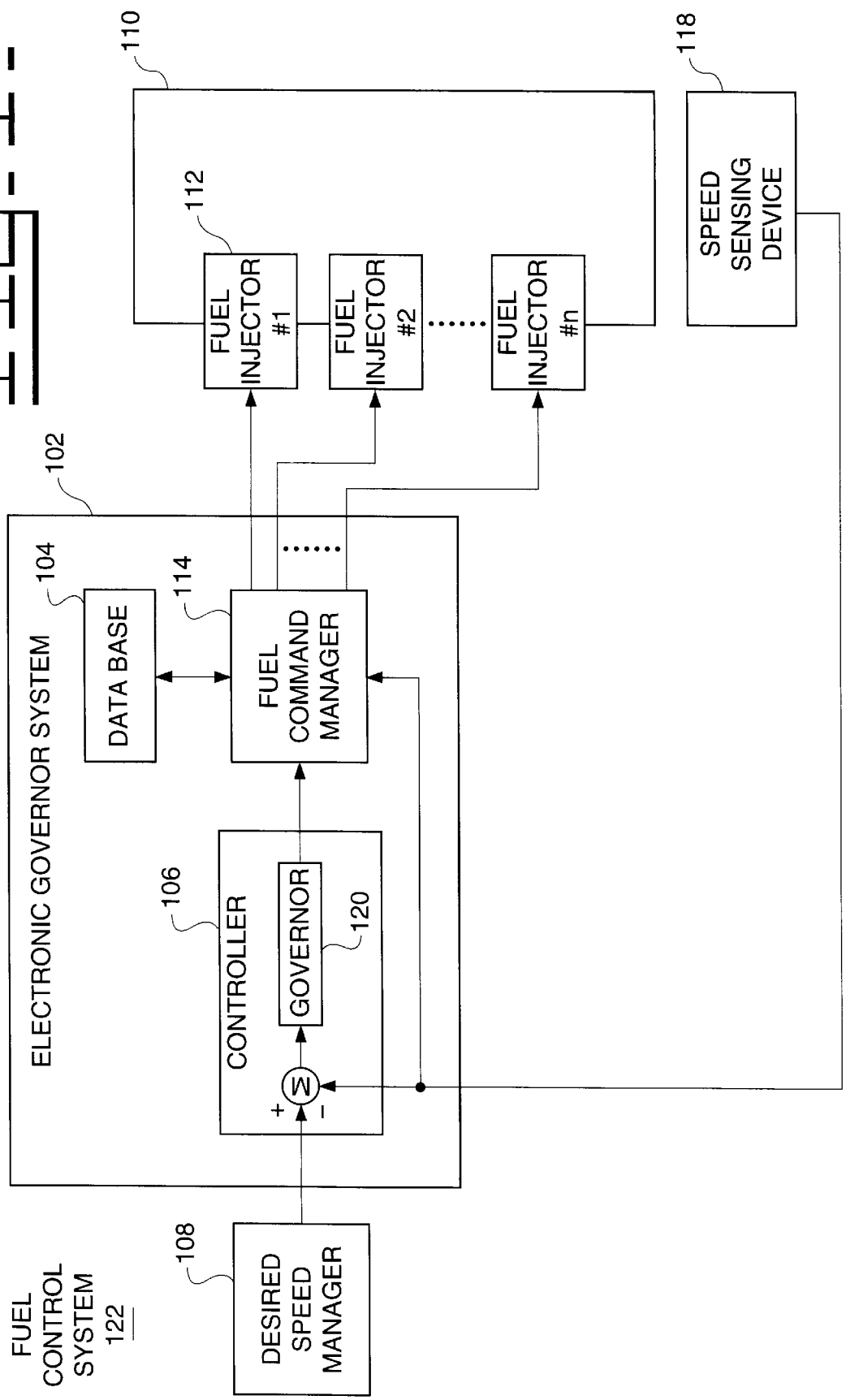

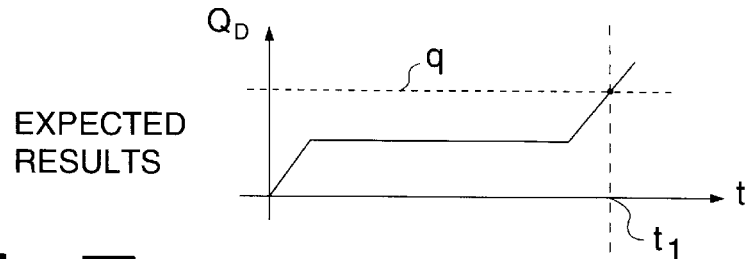
Fig-2a- EXPECTED RESULTS
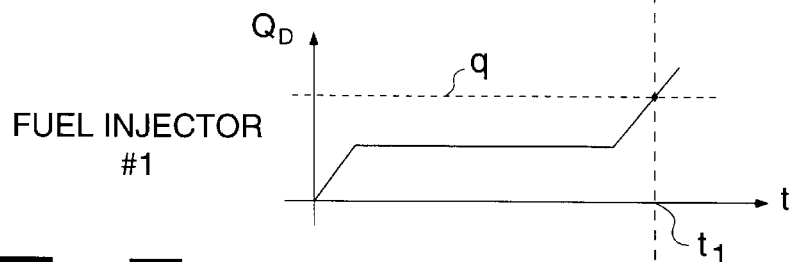
Fig-2b- FUEL INJECTOR #1
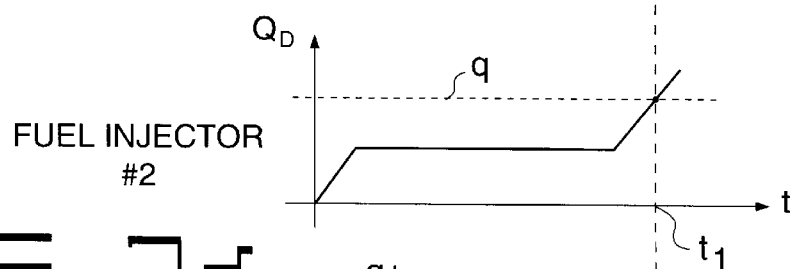
Fig-2c- FUEL INJECTOR #2
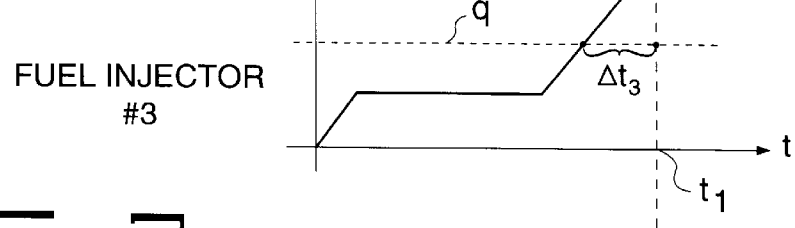
Fig-2d- FUEL INJECTOR #3
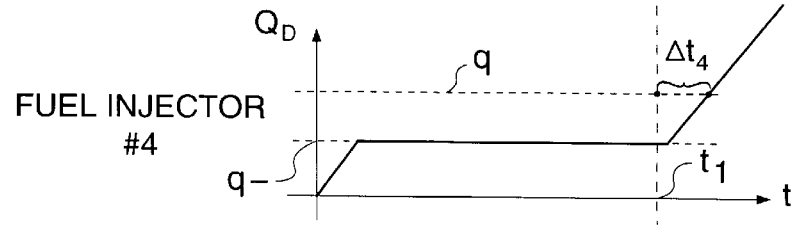
Fig-2e- FUEL INJECTOR #4

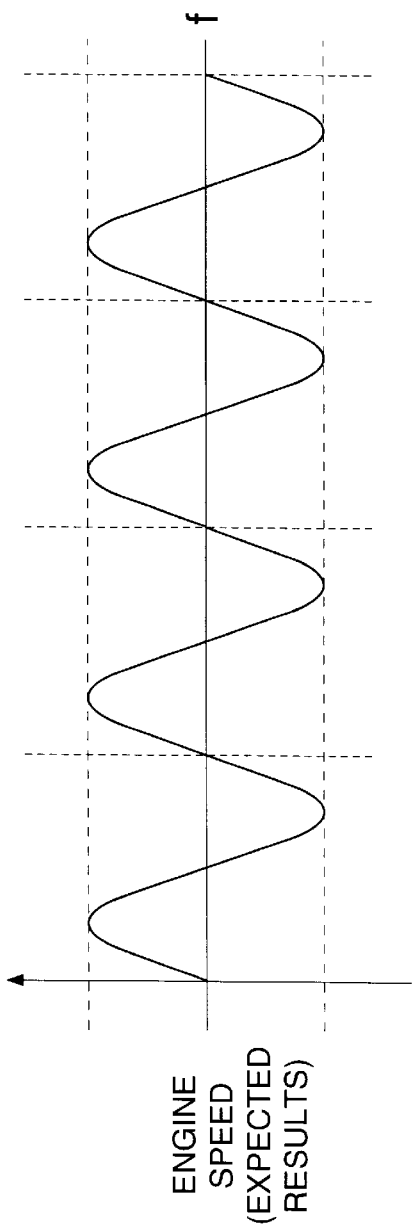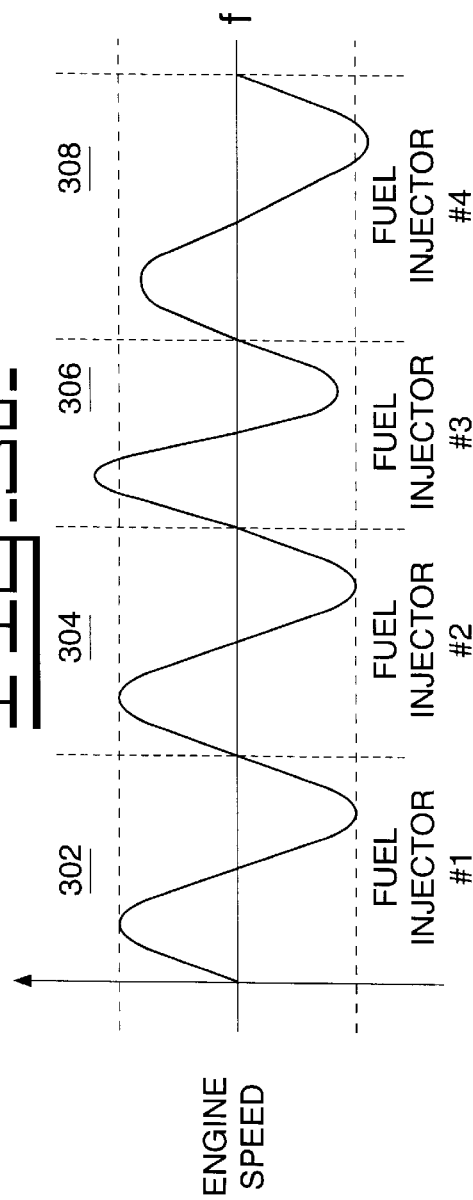

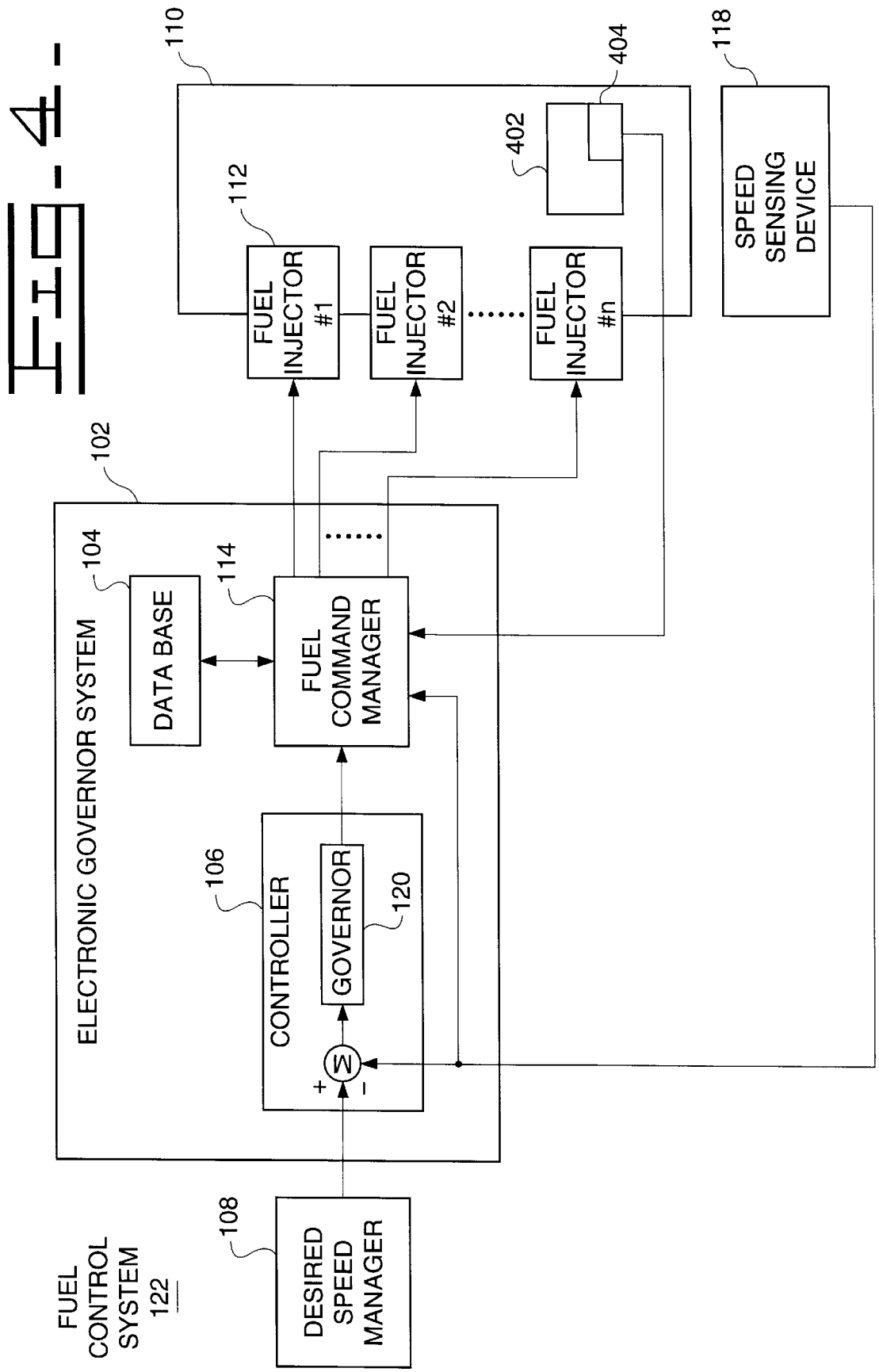

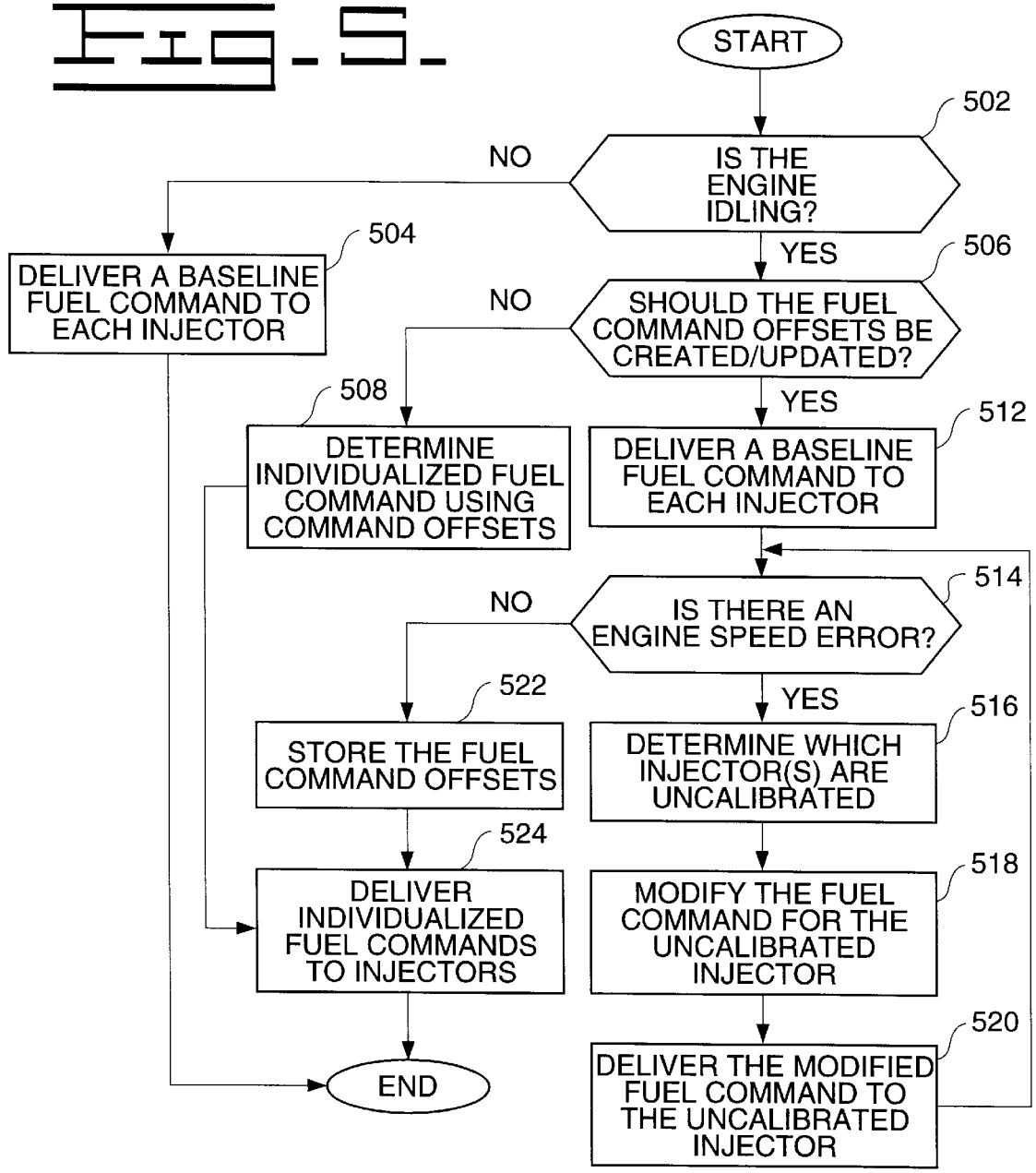

METHOD AND APPARATUS FOR DYNAMICALLY CALIBRATING A FUEL INJECTOR

TECHNICAL FIELD

The present invention relates generally to a fuel injector connected to an engine, and more particularly, to a method and apparatus for determining an individualized fuel command for each of a plurality of fuel injectors connected to an engine.

BACKGROUND ART

The fuel quantity that is delivered to an internal combustion engine may be determined by an electronic governor system. The electronic governor system determines the amount of fuel that should be injected by each fuel injector into the engine. The governor system then sends a fuel command to the fuel injectors to deliver the fuel. In typical electronic governor systems the same fuel command is sent to each fuel injector. However, due to variances between each fuel injector, the same fuel command does not inherently result in the same quantity of fuel being delivered to the engine by each injector. The result of fuel variations is an incorrect engine speed. Under most of the operating range of an engine, the variances between each fuel injector are not significantly noticeable. However, at low engine speeds, especially when the engine is idling, small variances in fuel quantity can result in proportionally large variances in resultant engine speed. For example, an engine may be running at 3000 revolutions per minute (rpm) and each fuel injector commanded to deliver 200 mm of fuel to maintain the speed. If a fuel injector is off by plus or minus 2 mm of fuel, the resulting engine speed will not be noticeably effected. However, if an engine is idling at 500 rpm and a fuel injector is commanded to deliver 8 mm of fuel to maintain the speed, a variance of 2 mm of fuel will make a significant impact on the resultant engine speed. Delivering an incorrect fuel quantity when an engine is running at low speeds will result in the engine not running smoothly.

Some systems create a calibration curve for each fuel injector and download the curve to an EPROM mounted on the injector. However flow rates for each fuel injector may change during the operation of the engine, rendering a static calibration curve inaccurate after a short period of time.

The present invention is directed to overcoming one or more of the problems set forth above.

DISCLOSURE OF THE INVENTION

In one aspect of the present invention, an apparatus for determining an individualized fuel command for each of a plurality of fuel injectors connected to an engine is disclosed. The apparatus includes a controller that is adapted to determine a baseline fuel command in response to a desired engine speed and an actual engine speed. The apparatus also includes a fuel command manager that is adapted to determine the individualized fuel command in response to the actual engine speed and the baseline fuel command.

In another aspect of the present invention, a method for dynamically determining an individualized fuel command for each of a plurality of fuel injectors connected to an engine is disclosed. The method includes delivering a baseline fuel command to the injectors, and determining an actual engine speed. The individualized fuel command for the fuel injectors is determined in response to the actual engine speed and the baseline fuel command.

BRIEF DESCRIPTION OF THE DRAWINGS

FIG. 1 shows a block diagram of a fuel control system;

FIG. 2a–e illustrates fuel deliver traces for four injectors;

FIG. 3 illustrates engine speed traces for four injectors;

FIG. 4 illustrates a block diagram of an alternative embodiment of a fuel control system; and FIG. 5 shows a flowchart illustrating the method of determining an individualized command for the injectors.

BEST MODE FOR CARRYING OUT THE INVENTION

FIG. 1 illustrates one embodiment of a fuel control system 122 associated with the present invention. In the preferred embodiment, the fuel control system 122 is located within a mobile machine, such as an earth moving machine, automobile, or truck. The present invention provides an apparatus and method for dynamically determining an individualized fuel command for each of a plurality of fuel injectors 112 connected to an engine 110. The individualized fuel commands are generated such that each fuel injector 112 delivers an equivalent amount of fuel to the engine 110.

A fuel command for a fuel injector 112 includes information regarding the time duration that the fuel injector 112 injects fuel into the engine 110. The time duration is used to determine how long a current to a solenoid (not shown) of an respective injector 112 should remain "on" to inject the correct quantity of fuel from the injector 112 into the engine 110. Delivering the same fuel command to each fuel injector 112 does not insure that equivalent fuel quantities will be delivered to the engine 110 due to variances of the fuel injectors. That is, due to potential variances of each fuel injector, fuel injectors may have different fuel delivery rates. For example, FIG. 2 illustrates the fuel output ($Q_d$), as a function of time, for a fuel injector 112. FIG. 2A illustrates an example of an baseline fuel output trace. FIGS. 2B–2E illustrate an example of fuel output traces, of four hypothetical fuel injectors 112 connected to a four cylinder engine 110. The time referenced in the fuel output trace is the time a solenoid is "on" for an fuel injector 112. A solenoid activation time t1 results in equivalent, fuel outputs (q) for the baseline injector, and injectors 1 and 2, more fuel output than expected (q+) from injector number 3, and less fuel (q−) from injector number 4.

An engine speed trace resulting from applying an activation time of t1 to the fuel injectors 112 illustrated in FIG. 2, is shown in FIG. 3B. The engine speed trace illustrates the engine speed for each cylinder firing over time. The engine speed trace associated with the baseline fuel delivery rate shown in FIG. 2A, is illustrated in FIG. 3A. Fuel injectors one and two injected equivalent fuel quantities (q), resulting in equivalent cylinder firing periods 302, 304. In addition, the maximum (or minimum) engine speeds are equivalent. Fuel injector number 3 injected more fuel (q+) resulting in a shorter cylinder firing period 306, and a larger engine speed amplitude. Fuel injector number 4 injected less fuel (q−) resulting in a longer cylinder firing period 308, and a smaller engine speed amplitude. Therefore, fuel injectors 112 one and two are considered to be calibrated because they deliver the proper amount of fuel for a given command. That is the fuel delivery of fuel injectors 112 one and two results in an engine speed equivalent to the expected baseline engine speed. In addition, fuel injectors 112 three and four are considered to be uncalibrated because they do not currently deliver the proper amount of fuel.

Varying the duration a solenoid is "on" will vary the amount of fuel injected into the engine 110. Therefore, varying the duration the solenoid is "on" is one way to account for variations in fuel delivery by different fuel injectors 112, resulting in equivalent fuel flow to the engine 110 from each injector 112. For example, reducing the length of time the solenoid for fuel injector number three stays "on" by $\Delta t_3$ will result in the proper fuel delivery. Increasing the length of time the solenoid for the fourth fuel injector by $\Delta t_4$ will result in the proper fuel delivery. The amount the fuel command needs to be varied is called a fuel command offset. Therefore, adding the proper fuel command offset to the baseline fuel command will result in the calibration of a fuel injector 112.

One object of the present invention is to dynamically determine an individualized fuel command which will result in equivalent fuel quantities being released into the engine 110. The individualized fuel command will include the baseline fuel command and an appropriate offset, resulting in equivalent engine speeds during each cylinder firing.

In one embodiment of the present invention, the fuel control system 122 includes an electronic governor system 102, a desired speed manager 108, and a speed sensing device 118. In the preferred embodiment, the electronic governor system 102 includes a controller 106 and a fuel command manager 108.

The desired speed manager 108 determines a desired speed of the engine 110 and responsively delivers a desired engine speed signal to the controller 106. The desired speed manager 108 may include operator throttle settings, cruise control logic, power take-off speed setting, or environmentally determined speed setting due to, for example, engine coolant temperature A speed sensing device 118 senses an actual speed of the engine 110 and responsively delivers an actual engine speed signal to the controller 106. The speed sensing device 118 may be a device sensitive to the passing of gear teeth by a magnetic pickup mounted on the engine 110, as is well known in the art.

The controller 106 receives the desired and actual engine speed signals and responsively determines a baseline fuel command. In the preferred embodiment the controller 106 includes a governor 120. The controller 106 compares the desired and actual engine speeds and responsively determines an engine speed error. The governor 120 receives the engine speed error and, using techniques well known in the art, generates the baseline fuel command for each fuel injector 112. The baseline fuel command is equivalent for each injector 112. The governor 106 generates the baseline fuel command in response to receiving the error signal and determining a desired engine speed change such that the resulting actual speed will equal the desired speed. The baseline fuel command signal is delivered to the fuel command manager 114.

The fuel command manager 114 receives the baseline fuel command from the controller 106, and the actual engine speed, and determines an individualized fuel command for each fuel injector 112. The individualized fuel commands include the baseline fuel command and a fuel command offset. The resulting fuel command is an individualized command that will enable each fuel injector 112 to deliver an equivalent amount of fuel to the engine 110. The fuel command manager 106 then delivers the fuel commands to each of the fuel injectors 112.

The electronic governor system 102 may include a database 104. The database 104 includes a plurality of actual engine speed changes and the corresponding fuel command offsets that caused the change in engine speed, for each fuel injector 112. In the preferred embodiment, the database 104 includes a plurality of lookup tables, each lookup table corresponding to a fuel injector 112. The lookup tables include the actual engine speed changes, and the corresponding fuel command offsets that caused the change in engine speed.

The electronic governor system 102 preferably includes RAM and ROM modules that store software programs to carry out certain features of the present invention. Further, the RAM and ROM modules may store a plurality of lookup tables encoded in software. The lookup tables including the fuel command offsets. The electronic governor system 102 also includes at least one microprocessor for executing the software programs.

In one embodiment of the present invention, the individualized fuel commands are determined and delivered to the fuel injectors 112 anytime the engine 110 is running. In an alternative embodiment, the fuel command manager 108 only delivers the individualized fuel commands to the injectors 112 when the engine 110 is idling. One method of determining when the engine is idling is by monitoring the engine speed. The fuel command manager 114 may receive the actual engine speed signal and determine when the engine speed is within a predetermined range, such as 500–900 revolutions per minute (rpm). When the engine speed is within the predetermined range, the engine 110 is considered to be idling, and the individualized fuel commands are determined and delivered to each injector 112. When the engine speed is outside the predetermined range the baseline fuel command generated by the controller 106 is delivered, without modification, to each fuel injectors 112.

In the preferred embodiment, the fuel command offsets are created when the engine 110 is initially turned on and the engine 110 is warmed up and idling. The fuel command offsets may be updated periodically when the engine speed enters the idling range, or every time the engine speed is within the idling range.

In the preferred embodiment the engine 110 is determined to be warmed up by monitoring the temperature of the oil in the crankcase 402 of the engine 110, as shown in FIG. 4. An oil temperature sensing device 404 is used to sense the temperature of the oil located within the crankcase 402. The oil temperature sensing device 404 delivers an oil temperature signal to the fuel command manager 114. The oil temperature sensing device may be a resistive temperature device, or a thermocoupled temperature sensor. When the oil temperature is larger than a predetermined threshold, then the engine is determined to be warmed up. Alternatively, once the engine 110 has been turned on, and idling for a predetermined amount of time, e.x., twenty seconds, then the engine 110 may be determined to be warmed up.

The method shown in FIG. 5 illustrates one embodiment of the operation of the present invention. In the preferred embodiment the present invention is used when the engine is idling. Therefore, in a first decision block 502 the fuel command manager receives the actual engine speed signal and determines whether the engine 110 is idling. In one embodiment the engine 110 is determined to be idling when the sensed engine speed is between 500 and 900 rpm. If the engine 110 is not idling, then control passes to a first control block 504 and the fuel command manager 114 delivers the baseline fuel command generated by the controller 106 to each of the fuel injectors 112. In an alternative embodiment, the invention may be used throughout the operation of the engine 110, therefore, the first decision and control blocks 502, 504 may be omitted.

If the engine 110 is idling, control passes to a second decision block 506 and the fuel command manager 114 determines if the fuel command offsets need to be created or updated. In the preferred embodiment the fuel command offsets are created each time the engine 110 is turned on, and then periodically updated during the operation of the engine 110. For example, the fuel command offsets may be updated every third or fourth time the engine speed returns to within the idling range.

If the fuel command offsets are to be created or updated, then control passes to a second control block 512 to begin calibrating the fuel injectors 112. In the second control block 512 the fuel command manager 114 delivers the baseline fuel command, generated by the controller 106, to each injector 112. Control then passes to a third decision block 514 and the fuel command manager 114 determines if there is an engine speed error. The fuel command manager 114 compares the actual engine speed with the expected engine speed. In the preferred embodiment the expected engine speed is determined in response to the baseline fuel command. That is, given the baseline fuel command, the engine speed illustrated in FIG. 3A should result. In the preferred embodiment, the actual engine speed for each cylinder firing is compared to an expected engine speed to determine if an engine speed error has occurred. In an alternative embodiment the engine speed for each cylinder firing may be compared relative to each other, to determine which fuel injectors 112, if any needed calibrating.

If there is an engine speed error, then control passes to a third control block 516 to determine which of the injectors 112 needs calibrating. Methods to detect the fuel output variance among the fuel injectors include comparing the period of each cylinder firing, shown in FIG. 3B, with an expected period, shown in FIG. 3A, and comparing the amplitude of the engine speed during each cylinder firing. In the preferred embodiment determination is done by monitoring the rotation of specific gear teeth of the flywheel (not shown). If one gear tooth is monitored on the flywheel, then the duration of a cylinder firing may be determined. Therefore, the period for the cylinder firing may be determined. By comparing the period of the cylinder firing with the expected period, a determination may be made regarding whether the fuel command to a particular injector 112 needs modifying. In an alternative embodiment an engine trace may be generated, as shown in FIG. 3, and the maximum speed amplitude of each cylinder firing may be compared with an expected maximum amplitude. If there is a discrepancy, then the fuel command to that particular injector 112 needs modifying. Once the fuel injector(s) 112 which need to be calibrated is determined, control passes to a fifth control block 518 to determine the amount to modify the fuel command to the uncalibrated injector 112. If the period of the engine speed during the cylinder firing was shorter than expected, ex., injector number three of FIG. 3, then the fuel command needs to be reduced, thereby reducing the amount of fuel delivered by that particular injector 112. If the period of the engine speed is longer than expected, ex., injector number four of FIG. 3, the fuel command needs to be increased. The amount the fuel command is modified may be predetermined or dynamically calculated. For example, a calibration lookup table may be used. The calibration lookup table includes predetermined fuel command offsets for given engine speed errors.

The calibration lookup table may be created by modifying the baseline fuel command to a particular injector 112, monitoring the resulting speed change, and storing the speed change and the modified fuel command, or fuel command offset, in the lookup table. Then, during the operation of the engine 110, when the engine speed for that particular injector 112 is in error, the lookup table may be used to determine how much of an offset to add to the baseline fuel command to overcome the current engine speed error, based on previous engine speed changes. Alternatively, when an injector does need calibrating, the modified fuel command could be dynamically determined by the size of the engine speed error. The resulting modified fuel command includes the baseline fuel command and the fuel command offset for that particular injector 112.

In a sixth control block 520 the modified fuel command is delivered to the uncalibrated injector 112. The calibrated injectors receive the baseline fuel command and any associated fuel command offset determined necessary to achieve calibration. In the preferred embodiment, the fuel command to each injector 112 may be modified at the same time without affecting the calibration process of the other injectors 112. In an alternative embodiment, the fuel injectors may be sequentially calibrated by only modifying the fuel command for one injector 112 at a time. Once the injector 112 at issue is calibrated, the process is repeated for the next uncalibrated injector 112.

Once the modified fuel command is delivered to the fuel injector(s) 112, control returns to the third decision block 514 to determine if there is still an engine speed error. If there is still an engine speed error, then the third, fourth, and fifth control blocks 514, 516, 520 are repeated.

If there is no engine speed error for any of the cylinders, the control passes from the third decision block 514 to the seventh control block 522. In the seventh control block 522 the fuel command offsets are stored. In the preferred embodiment the command offsets are stored in a lookup table contained in the database 104. Control then passes to an eighth control block 524, and the individualized fuel commands are delivered to the injectors 112.

Referring back to the second decision block 506, if the fuel injector offsets are not created or updated, control passes to the ninth control block 508. In the ninth control block 508 the fuel injector offsets are retrieved from storage and combined with the baseline fuel command, resulting in an individualized fuel command for each fuel injector. In a tenth control block 524 the individualized fuel commands are delivered to each injector 112.

Industrial Applicability

With reference to the drawings and in operation, the present invention is adapted to provide a method and apparatus for dynamically determining an individualized fuel command for each fuel injector connected to an engine. In the preferred embodiment the method includes delivering a baseline fuel command to each of the injectors. The actual engine speed is then determined. An individualized fuel command is determined for each of the fuel injectors based on the baseline fuel command, and the actual engine speed.

In the preferred embodiment the individualized fuel commands are dynamically determined when the engine is idling. A small variance in fuel delivery among the fuel injectors will be the most noticeable at low engine speeds, such as idling. Small variances in fuel delivery at low engine speeds will cause the engine to run roughly. In an alternative embodiment, the individualized fuel commands may be used throughout the operating speed range of the engine.

Other aspects, objects, advantages and uses of the present invention can be obtained from a study of the drawings, disclosures and appended claims.

I claim:

1. An apparatus for determining an individualized fuel command for each of a plurality of fuel injectors connected to an engine:

a controller being adapted to determine a baseline fuel command in response to a desired engine speed and an actual engine speed, and responsively generate a baseline fuel command signal;

a database for storing a fuel command offset for each of said fuel injectors;

a fuel command manager being adapted to receive said baseline fuel command signal, determine a fuel command offset for each of said fuel injectors in response to said baseline fuel command and said actual engine speed, and determine said individualized fuel command in response to said fuel offset and said baseline fuel command.

2. An apparatus as set forth in claim 1, wherein said database further comprises:

a plurality of look-up tables, each look-up table corresponding to one of said fuel injectors, said look-up table containing said fuel offsets.

3. An apparatus as set forth in claim 1 further comprising:

a crankcase oil temperature sensing device being adapted to sense the temperature of a crankcase oil located within the engine, and responsively generating an oil temperature signal;

wherein said fuel command manager is adapted to receive said oil temperature signal and said baseline fuel command signal, determine a fuel command offset for each of said fuel injectors in response to said baseline fuel command, said actual engine speed, and said oil temperature, and determine said individualized fuel command in response to said fuel offset and said baseline fuel command.

4. A method for dynamically determining an individualized fuel command for each of a plurality of fuel injectors connected to an engine, comprising the steps of:

determining a desired engine speed;

determining a baseline fuel command in response to said desired engine speed;

determining an actual engine speed;

comparing said desired engine speed and said actual engine speed;

determining an offset fuel command for each fuel injector in response to said comparison; and determining said individualized fuel command for each of the fuel injectors in response to said fuel offset and said baseline fuel command.

5. A method as set forth in claim 4, wherein the step of comparing said desired and actual engine speed further comprises the step of determining an engine speed error associated with each fuel injector in response to said desired and actual engine speeds.

6. A method as set forth in claim 5, wherein the step of determining an individualized fuel command further includes the step of:

determining said individualized fuel command for each of said injectors in response to said baseline fuel command and said offset fuel command.

7. A method as set forth in claim 6 further comprising the step of:

determining said offset fuel command when said actual engine speed is within a idling range.

8. A method as set forth in claim 4 further comprising the step of:

determining said individualized fuel command when said engine speed is within a idling range.

9. A method as set forth in claim 6 further comprising the steps of:

delivering said individualized fuel command to said injector when said actual engine speed is within an idling range; and, delivering said baseline fuel command to said injector when said actual engine speed is one of greater than and less than said idling range.

10. A method as set forth in claim 4, further including the step of storing each said individualized fuel command.

11. A method as set forth in claim 4, further including the step of storing each said fuel offset.

12. A method for determining an individualized fuel command for each of a plurality of fuel injectors connected to an engine, comprising:

determining a desired engine speed;

delivering a baseline fuel command to each of said injectors;

determining an actual engine speed;

determining an engine speed error in response to said desired and actual engine speeds;

determining an offset fuel command for each fuel injector in response to said engine speed error;

storing said offset fuel command; and determining said individualized fuel command to said fuel injector in response to said baseline fuel command and said offset fuel command.

13. A method for determining an individualized fuel command for each of a plurality of fuel injectors connected to an engine, comprising:

a) determining a desired engine speed;

b) delivering a baseline fuel command to each of said injectors c) determining an actual engine speed;

d) determining an engine speed error for each of said injectors in response to said desired and actual engine speeds;

e) determining an offset fuel command for each fuel injector in response to said engine speed error;

f) delivering a subsequent fuel command to each of said injectors in response to said baseline fuel command and said fuel injector offset;

g) repeating steps c) through f) until said engine speed error for each of said injectors is within a predetermined range;

h) storing said offset fuel command; and i) determining said individualized fuel command to said fuel injector in response to said baseline fuel command and said offset fuel command.

* * * * *